March 25, 1952     E. McDERMOTT     2,590,113
GEOCHEMICAL PROSPECTING
Filed March 12, 1947     2 SHEETS—SHEET 1
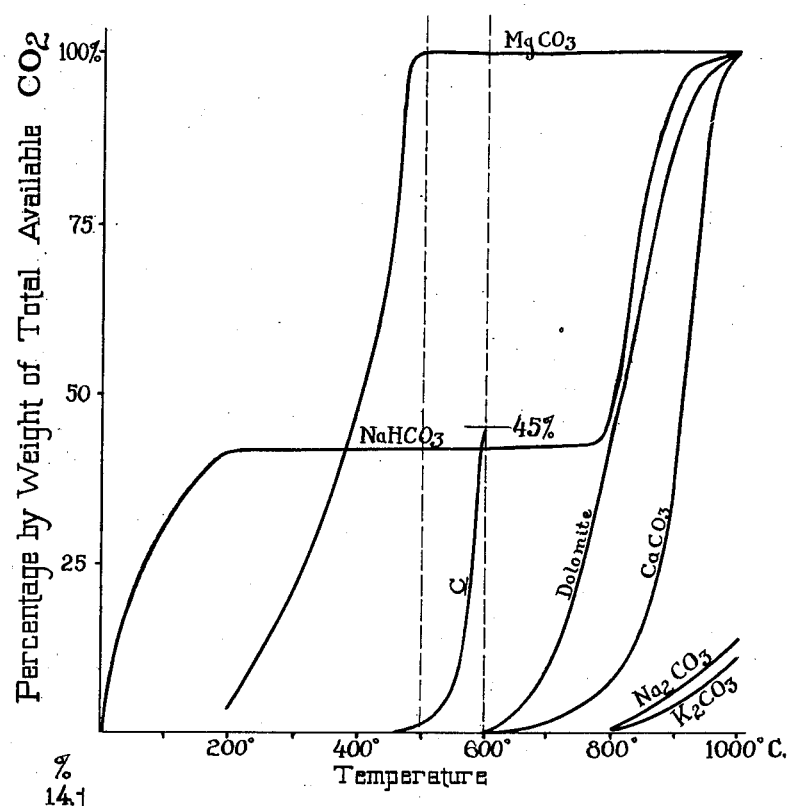
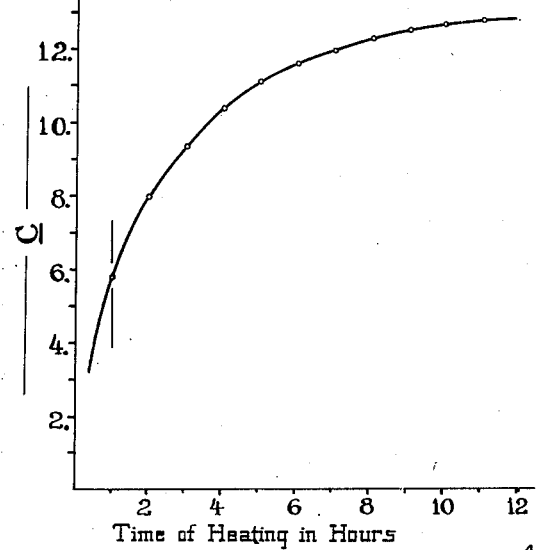
Eugene McDermott
INVENTOR
BY
ATTORNEYS Patented Mar. 25, 1952

2,590,113

UNITED STATES PATENT OFFICE 2,590,113

GEOCHEMICAL PROSPECTING

Eugene McDermott, Dallas, Tex.

Application March 12, 1947, Serial No. 734,072

3 Claims. (Cl. 23—232)

This invention relates to geochemical prospecting.

In geochemical prospecting, petroleum deposits are located by analyzing earth samples taken at or near the surface. Previous proposals include analysis of the samples for volatile hydrocarbons, a difficult procedure in view of the precautions required in protecting the samples during the interval before analysis and due to the fact that the quantities in which the substances occur are of the order of parts per hundred million. A variety of other substances, including a number of inorganic substances, have been utilized, with varying degrees of difficulty and expense in the analyses and with varying success in locating petroleum deposits. In my previous Patent No. 2,371,637, granted March 20, 1945, for a Method of Prospecting for Buried Deposits, I have disclosed a method involving analysis for what may be termed combustible carbon. As pointed out in that patent, the nature of the substance being determined was unknown as well as the theory connecting its presence with subjacent petroleum deposits. The method, however, was justified pragmatically by correlation with other methods and by the location of oil deposits. The present invention constitutes, in one aspect, an improvement upon the method disclosed in my said patent.

The general object of the present invention is to provide a geochemical prospecting method in which the analysis involved is simplified and the accuracy of the indications obtained is improved. This application is a continuation-in-part of my application Serial No. 568,518, filed December 16, 1944, for Standardization of Samples in Geochemical Prospecting, now abandoned.

In the drawing:

Figure 1 is a chart showing dissociation of certain carbonates at various temperatures;

Figure 2 is a chart showing dissociation of hydrogenated carbonate as a function of time of heating.

Figure 3:
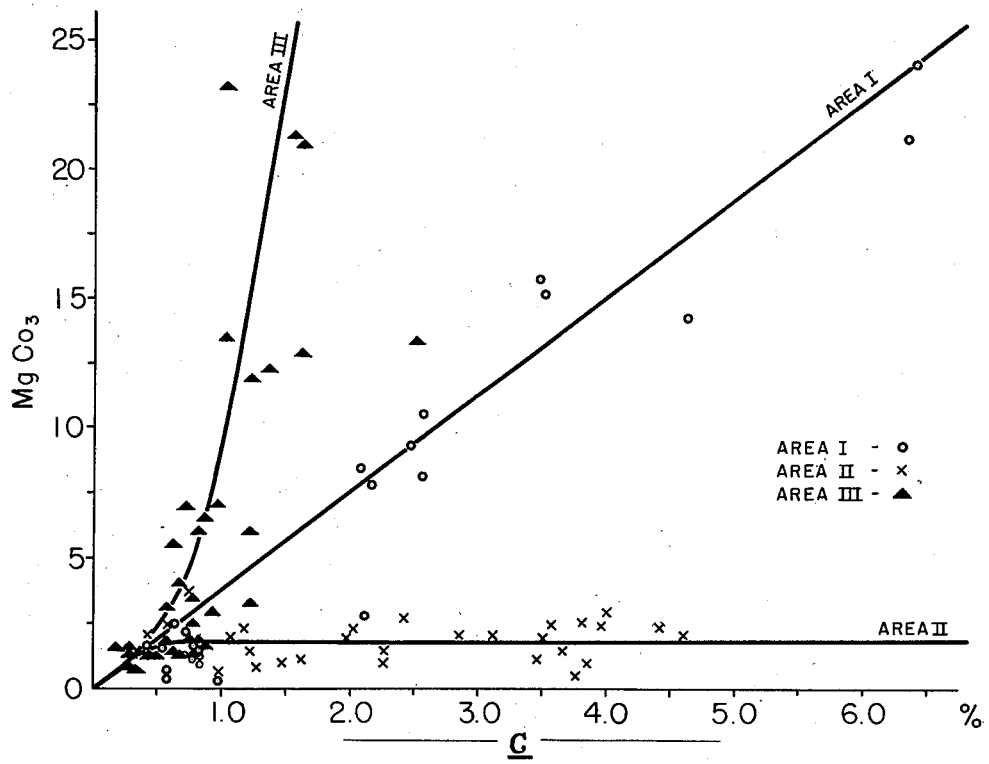
Figure 3 is a chart showing correlation between magnesium carbonate and hydrogenated carbonate.

Geochemical prospecting has, in general, been premised upon the supposition that upward leakage of hydrocarbon gases from an oil pool is detectable in one form or another at the surface. The most direct way of determining such a condition would, of course, be to analyze the samples for the gases themselves. This, however, as pointed out above, is a very difficult and expensive procedure. Another procedure would be to analyze the samples for substances entrained by the upwardly leaking gases and carried to the surface thereby. Such substances include soluble sulphates and chlorides, which may occur in quantities of the order of parts per ten thousand. The success of the methods employed does not necessarily depend upon this theory as to the reasons for the modification of the surface soil. I have pointed out an alternative hypothesis as to the formation of petroleum deposits which, however, also presupposes that such deposits will be associated with upwardly leaking hydrocarbon gases (Geochemical Exploration, Bulletin of the American Association of Petroleum Geologists, volume 24, No. 5).

A main difficulty in most of the previous methods proposed resides in the fact that the condition being determined is the result of a balance between factors tending to increase its magnitude and factors tending to diminish it. For example, where volatile hydrocarbons are determined, the quantity, present in the soil at any given time, is a function of the rate of upward leakage into the soil where the sample is taken as compared to the rate of upward leakage beyond this point and rate of action of any other factors tending to eliminate the volatile hydrocarbons. As a result, even though the time during which the leakage has been occurring may be of a geological order of magnitude, the amount of the volatile hydrocarbons present at any given time will always be very small. So also with soluble salts, as the quantity present in the soil samples will be determined by the difference between the rate at which such soluble salts are carried up to the location where the samples are taken, as diminished by the rate at which such salts are washed downwardly.

Clearly, if a soil characteristic which is produced by the hydrocarbon gases and which is cumulative can be utilized, a great advantage will be obtained, through analyzing substances which may occur in much larger proportions. My previous patent, above referred to, points out a procedure for determining such a substance, although the nature of this substance was not known and certain anomalies have been observed in carrying out the method, which has led to the belief that some additional factor or factors exist which were not taken into account.

In view of the known fact that hydrocarbon gas, such as methane, when subject to alpha particle radiation, will produce condensation products, and will liberate hydrogen, and in view of the known fact that there is a certain amount of radioactivity present in all soils, it is to be expected that areas in which small amounts of hydrocarbon gases have been present for geological time periods will contain products or by-products of such condensation reactions and in quantities which may be considerable. (Chemical Effect of Alpha Particles and Electrons—Lind.) The nature of the products formed will depend, as well, upon the nature of the substances of which the soil in question is composed.

Surface soils are composed mainly of silicates and alumino-silicates. In addition, calcium carbonate occurs, apparently embedded in the interstices of the alumino-silicates and is thus protected from leaching. Calcium carbonate is also the least soluble of the carbonates and for these reasons is the only carbonate generally found in the soil in any quantity. Some of the other carbonates may occur as a result of special conditions in some localities. Their occurrence, however, in any quantity is rare.

Typical condensation reactions such as may be postulated in the surface soil involve the conversion of a lighter hydrocarbon, such as methane, into a heavier hydrocarbon, such as ethane, with the liberation of hydrogen. Inasmuch as the condensation product does not normally persist in the soil, it will occur in small quantities and will be difficult to analyze. The hydrogen likewise will not persist as such, in quantity, but the reactions involved may result in hydrogenated substances of a persistent and cumulative character being produced from the activated hydrogen. I have discovered the apparent existence of such substances, in the nature of hydrogenated carbonate or bicarbonate ions in the calcium carbonate structure, and as a result thereof have been enabled to devise an improved method of geochemical exploration by analyzing soil samples for constituents which occur in quantities of the order of parts per thousand and parts per hundred.

In practicing the method of the present invention, the soil samples are prepared by preliminary heating or combustion at a temperature of about 500° centigrade, for the purpose of eliminating vegetable and animal matter and also to eliminate any carbonates or bicarbonates which dissociate at this temperature.

Figure 1 is a chart showing the dissociation of a number of carbonates upon one hour's heating at various temperatures. The abscissa represents the temperature at which the heating is conducted and the ordinates represent the amount of carbon dioxide, expressed as per cent of $CO_2$ available, after one hour's heating. The sodium bicarbonate curve, for example, shows an increase of $CO_2$ until a temperature of 200° is reached, after which there is no further increase until a temperature of about 800° is reached, further production of $CO_2$ at this temperature representing the dissociation of sodium carbonate. The other curves are similar but indicate the dissociation of the various other substances referred to. It will be observed that the carbonates shown will either dissociate at a lower temperature than 500° or will not dissociate appreciably until a temperature of about 600° is reached. There is no known carbonate which may occur in soil and which will dissociate to any considerable extent in the 500° to 600° temperature range. By preliminary heating for one hour at a temperature of 500° centigrade, I, therefore, eliminate not only animal and vegetable matter, but also any carbonates which might dissociate appreciably at a temperature of 500° C. Upon again heating samples, so prepared, at 600° C., however, I have observed the production of carbon dioxide in relatively large quantities.

The $CO_2$ so evolved upon heating a prepared sample at 600° C., or the carbon content thereof, is a significant soil characteristic, which, for convenience, I refer to as $\overline{C}$ ("C bar").

Figure 2 shows the amount of carbon dioxide 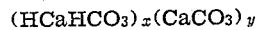 produced by the heating of a representative prepared sample at 600° C. and it will be observed that the amount of carbon dioxide produced on prolonged heating approaches 13.0% by weight of the sample. The sample was previously heated for two hours at 500° C. In view of the regularity of the curve of Figure 2, it is not necessary to heat the sample to completion, since the ultimate quantity of $CO_2$ produced can be gauged by the amount produced after heating for a fixed time, say, one hour. For example, in the sample represented in Figure 2, nearly half the final quantity of $CO_2$ is evolved after one hour's heating. This represents a quantity which is 6.0% by weight of the sample and which is readily determined without elaborate procedures.

Since the carbon dioxide is produced upon heating in an inert atmosphere, as well as upon heating in oxygen, it is reasonable to infer the presence of a substance in the nature of a carbonate, although not any known carbonate, and that this substance has been produced by a modification of calcium carbonate through hydrogenation, producing a substance having the hypothetical structure $$(HCaHCO_3)_x(CaCO_3)_y$$

(Where $x$ is always less than $y$.)

The above structure reacts with the water in the earth to produce: $(HOCaHCO_3)_x(CaCO_3)$.

Tests indicate that not more than half of the total calcium carbonate is ever so converted, and the hypothetical bicarbonate ion cannot exist by itself but only distributed in the original carbonate matrix.

When the prepared sample is treated with acid, such as HCl, the products produced are a salt of the acid, water and carbon dioxide. No hydrogen or carbon monoxide is evolved:

$$(HOCaHCO_3)_x(CaCO_3) + HClCaCl + CO_2 + H_2O$$

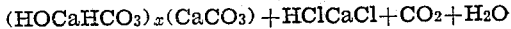

The hydrogenated calcium carbonate appears to be a by-product of hydrocarbon condensation reactions due to radioactivity of the soil, and hence the extent to which the carbonate has been converted to this form is an indication of the extent to which it has been subjected to hydrocarbon leakage. By determining the amount of conversion, an indication of the presence of petroleum deposits may, therefore, be obtained. It should be noted that, although a carbon compound is determined, the carbon does not appear to have been supplied from the hydrocarbon gases but rather to be a measure of the activated hydrogen produced by condensation reactions of such gases.

The time of heating and heating temperature (between 500° C. and 600° C.) may be varied, so long as conditions are the same for all samples or are reduced to a set of standard conditions.

The effect of normal carbonates, in producing a $\overline{C}$ value, was tested by adding large percentages of $CaCO_3$, $MgCO_3$ and $CaMg(CO_3)_2$ respectively, to earth samples, showing the carbonate percentages in themselves not to be a factor of any consequence in the $\overline{C}$ values determined.

Cumulative effects involving entrained materials may also be produced, resulting in further possibilities for analysis. In most areas tested, some of the calcium in the calcium carbonate will be replaced by magnesium. This substance, being relatively insoluble, can accumulate and be present in large quantities, as compared with the soluble salts present at any given time. Magnesium content of samples is negligible except over oil fields where such replacement can occur.

Figure 3 shows correlation obtained between C and magnesium determined as $MgCO_3$, for samples from three areas, indicated by circles, crosses and triangles, respectively. The slopes of the correlation curves vary, for the presumable reason that Mg in soluble form may have been supplied at varying rates in the various areas. It should be noted that even in area III, where the correlation curve is horizontal, no anomaly exists, since all values of Mg are in a low and non-significant range. The considerable dispersion of points observable in Figure 3 is characteristic of all samples taken in geochemical work and does not indicate any fault in the method or lack of correlation. The soil being non-homogeneous and the leakage into any sample area being affected by minor fissures and rock structures, sample dispersion is normal and consistent with theory. Magnesium content may be measured by usual chemical methods or spectrographically.

Either or both of the two modifications in the structure of calcium carbonate found in earth samples may be determined:

1. Hydrogenation of the carbonate ion—the hydrogenated carbonate ion remaining in the structure. This may also be called a bicarbonate ion in the calcium carbonate structure.

2. Replacement of some of the calcium ions by magnesium ions. As many as half the calcium ions may be so replaced.

The determination of the hydrogenated or bicarbonate ions in the calcium carbonate structure may be made in a variety of ways:

1. The highest temperature at which a sample may be heated without dissociating normal calcium carbonate and dolomite is 600° C.

2. Therefore, the sample is heated for one to several hours at 600° C. and the $CO_2$ liberated is measured. As organic matter in the sample will also give $CO_2$ if there is any oxygen present, the sample should be heated out of contact with oxygen. As this is very difficult, it is better to preheat the sample for one to several hours in an oxygen atmosphere at 400° C.–500° C. As Figure 1 shows, this will not dissociate any appreciable quantity of the hydrogenated carbonate ions in the calcium carbonate structure but will eliminate organic matter and any bicarbonates and if heated at 500° C. will eliminate any magnesium carbonate that may be present.

3. After heating for a predetermined period at 600° C., some of the hydrogenated carbonate ions are dissociated resulting in the liberation of $CO_2$ and the retention of hydroxyl (OH) ions in the calcium carbonate structure. The quantity of such ions may be determined by measuring the hydroxyl ion concentration with a standard pH meter or a standard conductivity meter (pH values and conductivity values prior to heating are not significant).

4. The determination of the magnesium replacing the calcium in the calcium carbonate structure may be made by the well known chemical methods or spectrographically. As practically all the magnesium present in all areas so far surveyed represents the replacement of calcium in the calcium carbonate structure, the determination of total magnesium content is satisfactory.

In many areas, the calcium carbonate content is relatively constant. However, where there are changes in carbonate content of the soil, especially abrupt changes, it may be desirable to measure total carbonates and make a correction for such changes. For instance, the determination of significant constituents above described may be divided by the total carbonate content. In general, it is best to determine the general relation between the various significant components and carbonate content in a given area and make the adjustment empirically to best fit the area.

This standardization is in a way analagous to the regional correction made in other methods of prospecting such as gravity, magnetic, electric and seismic. The necessity of such a correction may be minimized by statistically treating relatively small areas at a time, say a township or two.

In some areas this standardization of samples is desirable when other constituents, such as hydrocarbons, are being determined.

What is claimed is:

1. In a method of geochemical prospecting for petroleum in which soil samples are collected and analyzed, the steps which comprise subjecting the soil samples to combustion at a temperature of about 500° C. until organic matter is destroyed and $CO_2$ is eliminated from soil components which produce the same upon heating to 500° C., subject the said soil samples to a further heating to a temperature of about 600° C. in an inert atmosphere, thereby producing additional $CO_2$, and measuring such additional $CO_2$ so produced.

2. In a method of geochemical prospecting for petroleum in which soil samples are collected and analyzed, the steps which comprise subjecting the soil samples to combustion for a period of about one hour at a temperature of 500° C. to liberate $CO_2$ from organic matter and carbonates dissociating at such temperature, subjecting the said soil samples to a further heating for a period of about one hour at a temperature of about 600° C. in an inert atmosphere, and measuring the amount of additional $CO_2$ produced by such further heating.

3. The method according to claim 2, in which the heating at about 600° C. is carried out until at least about 50% by weight of the total additional $CO_2$ produceable by heating to completion is produced.

EUGENE McDERMOTT.

REFERENCES CITED

The following references are of record in the file of this patent:

UNITED STATES PATENTS

| Number | Name | Date |
|---|---|---|
| 2,324,107 | Pirson | July 13, 1943 |
| 2,330,021 | Arthur | Sept. 21, 1943 |
| 2,330,716 | Horvitz | Sept. 28, 1943 |
| 2,330,717 | Horvitz | Sept. 28, 1943 |
| 2,336,612 | Horvitz | Dec. 14, 1943 |
| 2,370,793 | Horvitz | Mar. 6, 1945 |
| 2,371,637 | McDermott | Mar. 20, 1945 |